United States Patent
Levy-Abegnoli et al.

(10) Patent No.: US 8,219,800 B2
(45) Date of Patent: Jul. 10, 2012

(54) SECURE NEIGHBOR DISCOVERY ROUTER FOR DEFENDING HOST NODES FROM ROGUE ROUTERS

(75) Inventors: Eric Michel Levy-Abegnoli, Valbonne (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1029 days.

(21) Appl. No.: 11/808,059

(22) Filed: Jun. 6, 2007

(65) Prior Publication Data

US 2008/0307516 A1    Dec. 11, 2008

(51) Int. Cl.
*H04L 29/06* (2006.01)
(52) U.S. Cl. .......................................... 713/154; 726/22
(58) Field of Classification Search ................ 726/4, 11, 726/22; 713/153, 154; 370/254, 401; 709/238
See application file for complete search history.

(56) References Cited

U.S. PATENT DOCUMENTS

| | | | | |
|---|---|---|---|---|
| 5,798,706 | A | * | 8/1998 | Kraemer et al. ................. 726/3 |
| 7,567,522 | B2 | * | 7/2009 | Borowski ...................... 370/254 |
| 2004/0240669 | A1 | * | 12/2004 | Kempf et al. ................. 380/277 |
| 2005/0237946 | A1 | | 10/2005 | Borowski |
| 2008/0250478 | A1 | * | 10/2008 | Miller et al. ..................... 726/5 |

OTHER PUBLICATIONS

Deering et al., "Internet Protocol, Version 6 (IPv6) Specification", Network Working Group, Request for Comments: 2460, Dec. 1998, pp. 1-39.
Narten et al., "Neighbor Discovery for IP Version 6 (IPv6)", Network Working Group, Request for Comments: 2461, Dec. 1998, pp. 1-93.
Thomson et al., "IPv6 Stateless Address Autoconfiguration", Network Working Group, Request for Comments: 2462, Dec. 1998, pp. 1-25.
Hinden et al., "Internet Protocol Version 6 (IPv6) Addressing Architecture", Network Working Group, Request for Comments: 3513, Apr. 2003, pp. 1-26.
Nikander et al., "IPv6 Neighbor Discovery (ND) Trust Models and Threats", Network Working Group, Request for Comments: 3756, May 2004, pp. 1-23.
Johnson et al., "Mobility Support in IPv6", Network Working Group, Request for Comments: 3775, Jun. 2004, pp. 1-165.
Arkko et al., "SEcure Neighbor Discovery (SEND)", Network Working Group, Request for Comments: 3971, Mar. 2005, pp. 1-56.
Aura, "Cryptographically Generated Addresses (CGA)", Network Working Group, Request for Comments: 3972, Mar. 2005, pp. 1-22.
Levy-Abegnoli et al., U.S. Appl. No. 11/636,433, filed Dec. 11, 2006.

* cited by examiner

*Primary Examiner* — Eleni Shiferaw
*Assistant Examiner* — Ali Abyaneh
(74) *Attorney, Agent, or Firm* — Leon R. Turkevich

(57) ABSTRACT

In one embodiment, a method comprises receiving, by a router in a network, a router advertisement message on a network link of the network; detecting within the router advertisement message, by the router, an advertised address prefix and an identified router having transmitted the router advertisement message within the network; determining, by the router, whether the identified router is authorized to at least one of advertise itself as a router, or advertise the advertised address prefix on the network link; and selectively initiating, by the router, a defensive operation against the identified router based on the router determining the identified router is not authorized to advertise itself as a router, or advertise the advertised address prefix on the network link.

19 Claims, 4 Drawing Sheets

SECURE NEIGHBOR DISCOVERY ROUTER FOR DEFENDING HOST NODES FROM ROGUE ROUTERS

TECHNICAL FIELD

The present disclosure generally relates to deployment of Secure Neighbor Discovery (SEND) in an Internet Protocol version 6 (IPv6) network.

BACKGROUND

The Internet Engineering Task Force (IETF) Request for Comments (RFC) 3971 describes a Secure Neighbor Discovery (SEND) protocol that specifies secure mechanisms to enable IPv6 nodes using Neighbor Discovery Protocol (NDP) according to RFC 2461 to counter malicious threats, without the necessity of IPSec protocols. NDP allows IPv6 nodes to determine each other's presence, to determine each other's link-layer addresses, to find routers, and to maintain reachability information about the paths to active neighbors. The SEND protocol specifies two relatively independent mechanisms to secure the IPv6 nodes, namely use of cryptographically-generated addresses (CGA) to ensure the sender of a neighbor discovery message is the owner of the claimed address, and Authorization Delegation Discovery. Authorization Delegation Discovery is used to certify the authority of routers via a trust anchor. A "trust anchor" is an authoritative source that can be trusted by host nodes, and which is used to certify the authority of routers: "certification paths" can be established from the trust anchors to enable a certified router to perform certification of another router; before any host can adopt a router as its default router, the host must be configured with a trust anchor that can certify the router via a certification path. Hence, the certificate format mandated by the SEND protocol enables the host node to learn a certification path of a router, and to validate the authenticity of a router.

BRIEF DESCRIPTION OF THE DRAWINGS

Reference is made to the attached drawings, wherein elements having the same reference numeral designations represent like elements throughout and wherein.

Figure 1:
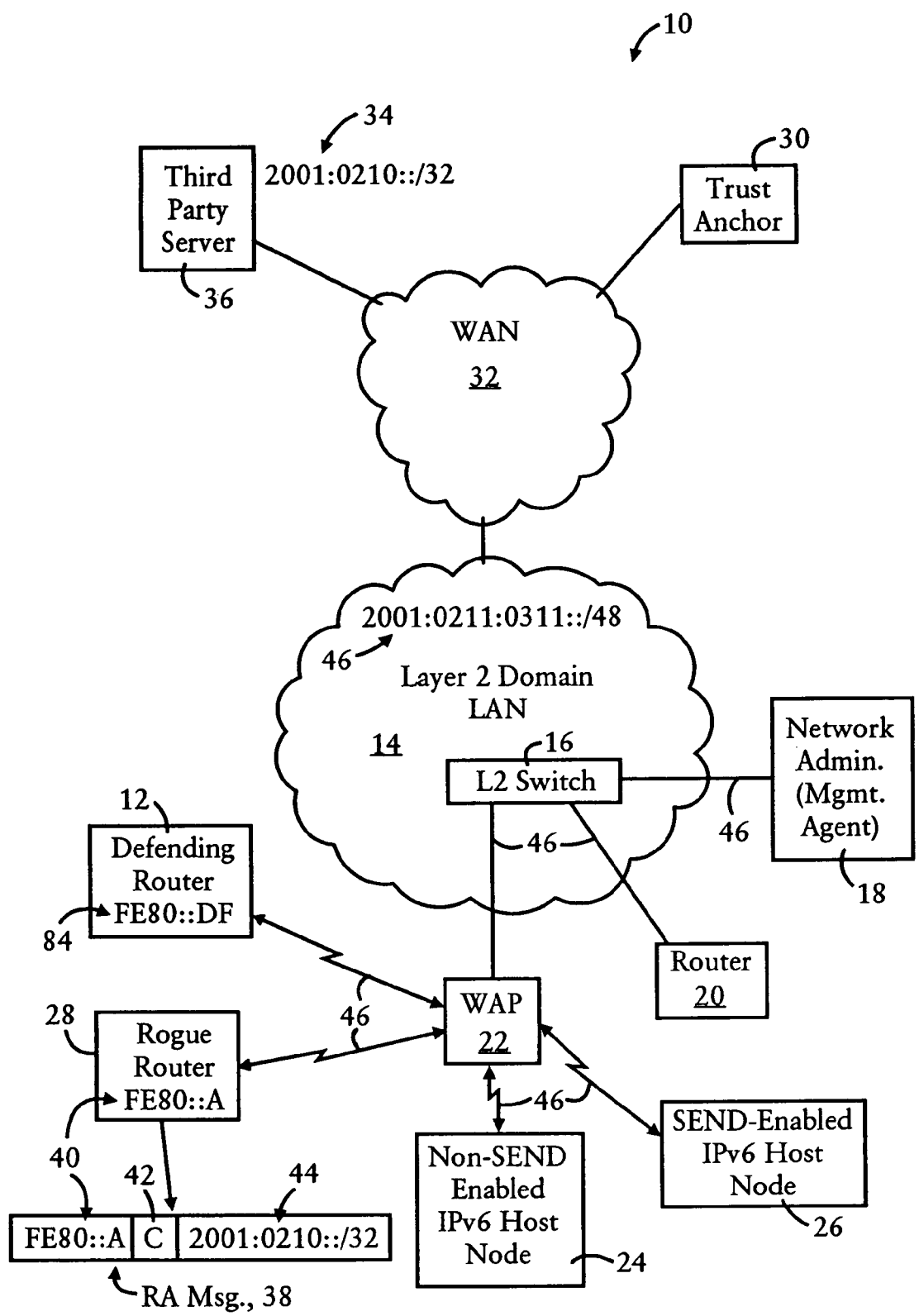
FIG. 1 illustrates an example system having at least one defending router for authenticating other routers and address prefixes advertised by the other routers to protect host nodes from rouge routers, according to an example embodiment.

DESCRIPTION OF EXAMPLE EMBODIMENTS
OVERVIEW

In one embodiment, a method comprises receiving, by a router in a network, a router advertisement message on a network link of the network; detecting within the router advertisement message, by the router, an advertised address prefix and an identified router having transmitted the router advertisement message within the network; determining, by the router, whether the identified router is authorized to at least one of advertise itself as a router, or advertise the advertised address prefix on the network link; and selectively initiating, by the router, a defensive operation against the identified router based on the router determining the identified router is not authorized to advertise itself as a router, or advertise the advertised address prefix on the network link.

In another embodiment, a router comprises an Internet Protocol (IP) interface circuit configured for receiving a router advertisement message on a network link in a network, and a routing circuit. The routing circuit is configured for detecting within the router advertisement message an advertised address prefix and an identified router having transmitted the router advertisement message within the network. The routing circuit further is configured for determining at least one of whether the identified router is authorized to advertise itself as a router or advertise the advertised address prefix on the network link, the routing circuit further configured for selectively initiating a defensive operation against the identified router based on determining the identified router is not authorized to advertise itself as a router, or advertise the advertised address prefix on the network link.

DETAILED DESCRIPTION

Particular embodiments enable a router in a local area network to monitor router advertisement messages sent by other network nodes, and determine whether the network nodes having transmitted the router advertisement messages are authorized to act as routers in the local area network; the router also determines and whether the address prefixes advertised in the router advertisement messages are authorized address prefixes. Conventional routers that have received router advertisement messages heretofore have been required to ignore and discard any router advertisement messages. The example embodiment, however, enables a router (referred to herein as a "defending router" or "watchdog router") to parse a received router advertisement message in order to identify the network node having transmitted the router advertisement message, and to identify an advertised address prefix specified within the router advertisement message. The defending router can determine whether the identified network node is authorized to advertise itself as a router in the network, and whether the network node is authorized to advertise the advertised address prefix on the network link of the network. If the defending router determines that the identified network node is authorized to advertise itself as a router, and/or to advertise the specified address prefix, the defending router permits operations to continue according to neighbor discovery protocol as specified in RFC 2461 and/or RFC 3971, as appropriate.

If, however the defending router determines that the identified network node is not authorized to advertise itself as a router, or advertise the address prefix specified in the router advertisement message (i.e., the other router is a "rogue router"), the defending router initiates defensive operations against the identified rogue router in order to secure the host network nodes in the local area network from the rogue router. For example, the defending router can output an alert to a prescribed management agent in the network, for example a network administrator, to notify the network administrator of the identified rogue router, enabling the network administrator to locate the rogue router and determine whether the rogue router is simply a misconfigured router or a malicious entity.

The defending router also can output an instruction to network switches to deny access to the identified rogue router based on the link layer address (e.g., a layer 2 Media Access Controller (MAC) address) of the rogue router, for example based on resolving the link layer address from the link local address of the rogue router. The defending router also can perform defensive operations that attack the identified rogue router, based on the defending router impersonating the rogue router and sending router advertisement messages specifying that the unauthorized address prefix is no longer usable, and neighbor advertisement messages with an override bit specifying that the link layer address of the identified rogue router is replaced with the link layer address of the defending router.

Hence, the defending router can act on behalf of host network nodes that are incapable of performing Secure Neighbor Discovery (SEND) protocol according to RFC 3971, to ensure that the host network nodes do not claim a network address from an unauthorized address prefix specified by the rogue router, or attempt to attach to the rogue router as a default router.

FIG. 1 is a diagram illustrating an example system 10 having a defending router 12 within a local area network 14. As illustrated in FIG. 1, the local area network 14 can be implemented for example as a single layer 2 domain having a link-local scope, where each node in the local area network 14 can use a link-local address as described in RFC 2461 and RFC 3513. The local area network 14 can include, in addition to the defending router 12, a layer 2 switch (e.g., an Ethernet switch) 16, a network administrator node (i.e., management agent) 18, a second router 20 that is authorized within the network 14, a wireless access point (WAP) 22 that provides link layer connectivity for wireless devices such as an IPv6 host node 24, a SEND-enabled IPv6 host node 26, and a visiting mobile router 28, which will be used as an example of a "rogue router".

The SEND-enabled IPv6 host node 26 is configured for performing secure neighbor discovery (SEND) as specified in RFC 3971, including obtaining configuration with a trust anchor 30 which can be reachable via an IP-based wide area network 32 in order to determine whether any router has a certification path that enables the SEND-enabled host 26 to authenticate any certificate, digital signature, or public key received from a router 12, 20, or 28. In particular, RFC 3971 requires that all router advertisement messages sent according to the SEND protocol include a digital signature, for example an RSA signature; as described herein, however, other secure tokens can be supplied, for example a public key, or a digital certificate such as an X.509v3 public key certificate; hence the term "secure token" as used herein refers to any one of the public key, the digital signature, or the digital certificate as described for example in RFC 3961.

Hence, assuming the router 28 is a rogue router, the SEND-enabled host 28 can determine that the rogue router 28 is not authorized to advertise a given IPv6 address prefix (e.g. "2001:0210::/32") 34 that is owned by a third-party entity 36. In other words, if the rogue router 28 outputs a router advertisement (RA) message 38 specifying a link local address ("FE80::A") 40, an invalid secure token ("C") (e.g., a certificate, a digital signature, or a public key) 42 and an unauthorized address prefix 44 (e.g., the address prefix 34 owned by the third-party 36), the SEND-enabled IPv6 host node 26 is able to determine from the trust anchor 30 that the secure token 42 is invalid, and therefore that the rogue router 28 is not authorized to claim the unauthorized address prefix 44.

The IPv6 host node 24, however, is a "legacy" device in that it has not been configured to perform Secure Neighbor Discovery (SEND) as described in RFC 3971. Hence, the IPv6 host node 24 would be unable to authenticate the invalid secure token 42. Accordingly, the defending router 12 is able to validate the router advertisement message 38, received via the network link 46, on behalf of the IPv6 host node 24 that is incapable of implementing the SEND protocol.

Hence, the defending router 12 can protect host nodes 24 that do not implement the SEND protocol from rogue routers 28 that advertise unauthorized address prefixes ("2001:0210::/32") 44. The defending router 12 can authenticate the router advertisement message 38 based on whether the specified address prefix 44 falls within the prescribed address realm 46 of the local area network 14, or based on authentication according to the SEND protocol in order to accommodate visiting mobile routers that advertise address prefixes that are outside the scope of the prescribed address realm 46 of the local area network 14. The defending router 12 also can determine whether the router advertisement message 38 originated from a network node that is authorized to advertise itself as a router on the local link 46, for example based on a prescribed list 68 of authorized routers (illustrated in FIG. 2), or based on validation of the secure token 42. If the defending router 12 determines that the rogue router 28 is not authorized to advertise itself as a router, or does not own the address prefix 44, the defending router 12 can initiate various defensive operations against the identified rogue router 28, described in further detail below.

Figure 2:
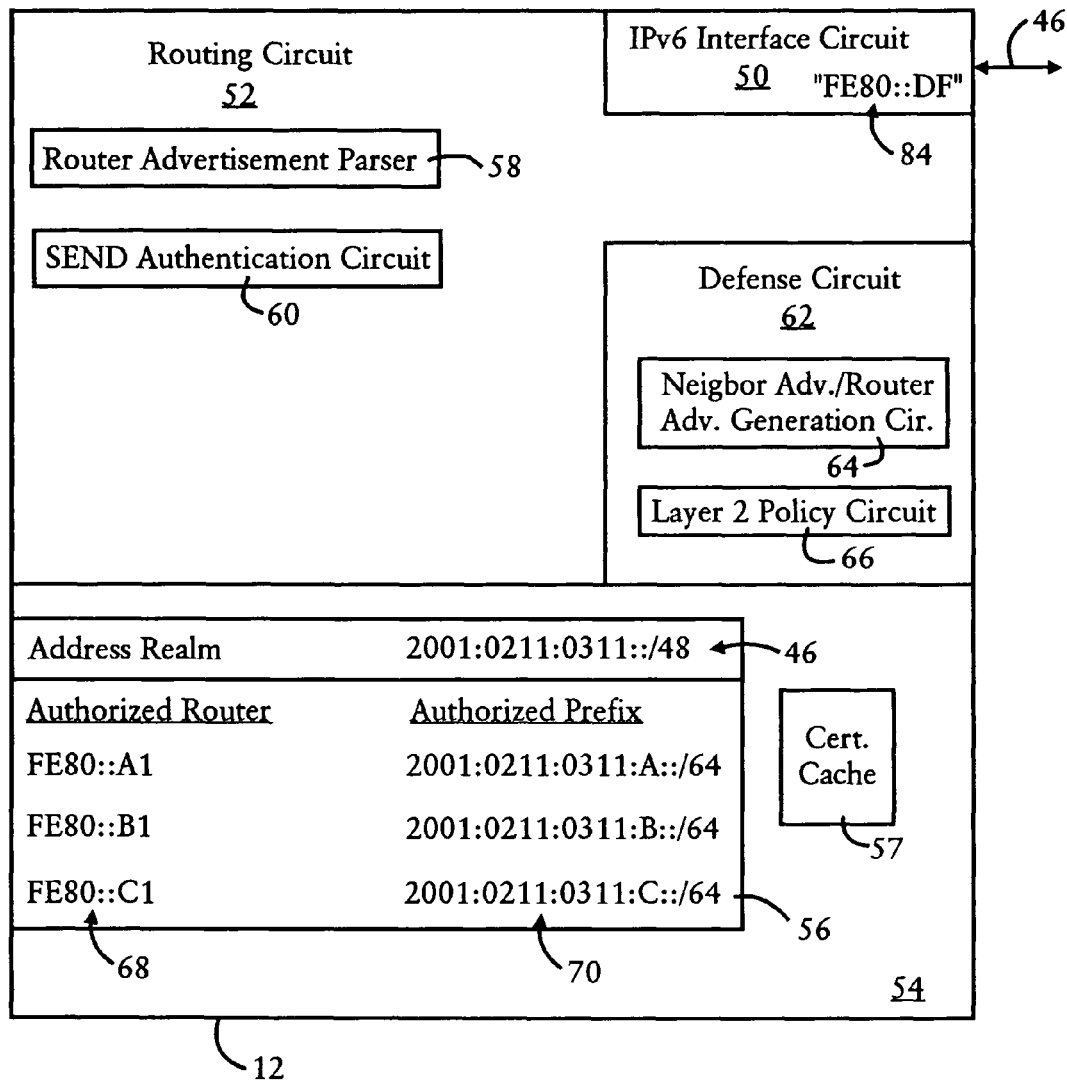
FIG. 2 illustrates an example defending router from the system of FIG. 1, according to an example embodiment.

FIG. 2 is a diagram illustrating an example defending router 12, according to an example embodiment. The defending router 12 can include an IPv6 interface circuit 50 having a prescribed link local address ("FE80::DF") 84, a routing circuit 52, and a memory circuit 54 including, for example, a data table 56, and a certificate cache 57.

Figure 4:
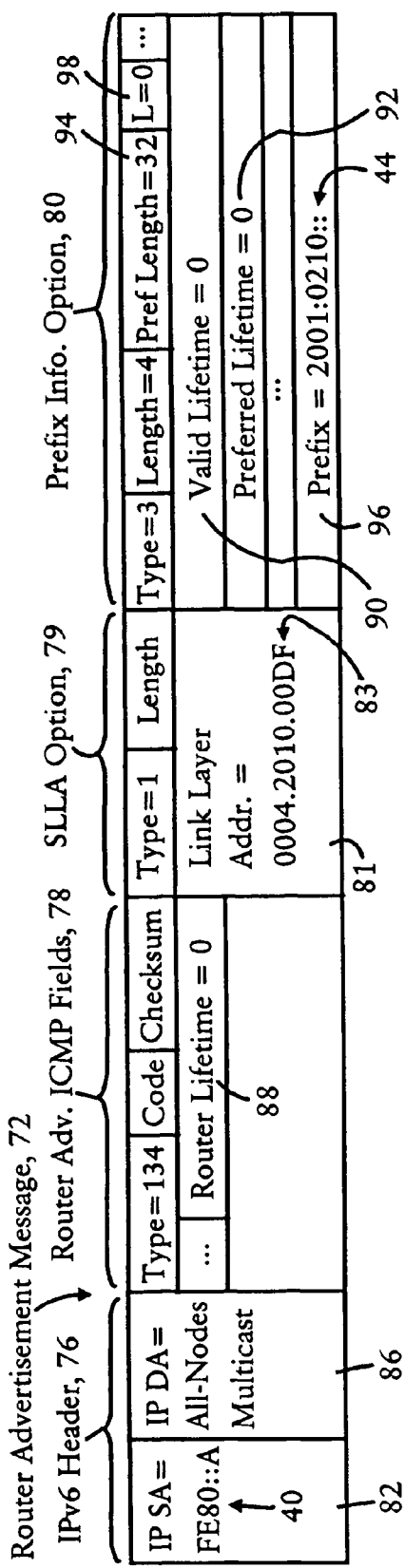
FIG. 4 illustrates an example router advertisement message output by the defending router of FIGS. 1 and 2 for defending against a detected rogue router, according to an example embodiment.

The IPv6 interface circuit 50 is configured for sending and receiving IPv6 packets via the network link 46 using its corresponding link local address ("FE80::DF") and link layer address (e.g. Media Access Control (MAC)), illustrated in FIG. 4 as the 48-bit hexadecimal link layer address value "0004.2010.00DF" 83. The network link 46 can be a wired link, for example a 100 Mbps or Gigabit Ethernet (IEEE 802.3) link, or a wireless link such as an IEEE 802.11 link. Hence, the example defending router 12 can be configured as a mobile router according to RFC 3775.

According to the example embodiment, the IPv6 interface circuit 50 is configured for receiving via the network link 46 a router advertisement message 38, illustrated in FIG. 1, from another router 28 in the network 14. In contrast to implementations in conventional routers that would discard the received router advertisement message 38, the IPv6 interface circuit 50 in the defending router 12 forwards the router advertisement message 38 to the routing circuit 52 for evaluation.

The routing circuit 52 can be configured for determining whether the router 28 having sent the router advertisement message 38 is authorized to advertise itself as a router, and/or advertise the address prefix 44 specified in the router advertisement message 38, within the local area network 14. For purposes of this description, the example local area network 10 can be assumed to operate within a single layer 2 domain; hence, regardless of whether the link 46 is wired or wireless, the router 12, the rogue router 28, the hosts 24 and 26 and all other nodes of the local area network 14 can be considered to be "on-link", i.e., on the same link as described in RFC 2461, since each of the respective link-local addresses of the respective interfaces used by the respective nodes are within the same prescribed link-local address realm of "FE80::/10", identified in Sections 2.4 and 2.5.6 of RFC 3513 as reserved for link-local unicast, for purposes such as automatic address configuration and/or neighbor discovery.

The routing circuit can include a router advertisement parser circuit 58, a SEND authentication circuit 60, and a defense circuit 62 that includes a neighbor advertisement/router advertisement generation circuit 64, and a layer 2 policy circuit 66. The router advertisement parser circuit 58 can be configured for parsing the received router advertisement message 38 in order to detect the contents of the message 38, including the advertised address prefix 44, the link local address ("FE80::A") 40 that identifies the router 28, and any secure token 42.

The SEND authentication circuit 60 can be configured for determining whether the router 28, identified by its corresponding link local address 40 in the received router advertisement message 38, is authorized to advertise itself as a router and/or advertise the advertised address prefix (e.g., "2001:0210::/32") 44, for example based on determining whether the identified router 28 is identifiable from a prescribed list 68 of authorized routers having respective authorized address prefixes 70, or based on authenticating the supplied secure token 42 according to SEND protocol relative to the trust anchor 30. For example, the SEND authentication circuit 60 can determine whether the secure token (e.g., an RSA signature) 42 is validated by a public key certificate from the trust anchor 30, either stored in the certificate cache 57 or received via a Certificate Path Advertisement Message that establishes a certification path to the trust anchor 30 in accordance with RFC 3971: the public key certificate enables the SEND authentication circuit to determine whether a certification path is established that validates that the secure token 42 authorizes the identified router 28 to advertise itself as a router, and that specifies the prefix within the secure token 42 to indicate the identifier router 28 is authorized to advertise the advertised address prefix 44.

The defense circuit 62 can be configured for selectively initiating a defensive operation against the router 28 based on the SEND authentication circuit 60 determining that the router 28, identified by its link local address 40, is not authorized to advertise the advertised address prefix ("2001:0210::/32") 44 on the network link 46, and therefore deemed a rogue router. For example, the defense circuit 62 can include a neighbor advertisement/router advertisement generation circuit 64 that can be configured for effectively impersonating the rogue router 28, for example by outputting a second router advertisement message 72, illustrated in FIG. 4, that supersedes the router advertisement message 38 output by the rogue router 28 and causes the non-SEND enabled IPv6 host 24 to stop relying on the unauthorized address prefix 44 for address autoconfiguration, or relying on the rogue router 28 as a default router. The neighbor advertisement/router advertisement generation circuit 64 also can be configured for effectively impersonating the rogue router 28 based on outputting a neighbor advertisement message 74, illustrated in FIG. 5, that overrides the link local address 40 of the rogue router with a prescribed link local address of the defending router 12 used by the IPv6 interface circuit 50, in order to cause the non-SEND enabled IPv6 host 24 to stop sending traffic to the rogue router 28 and begin sending traffic to the defending router 12.

Any of the disclosed circuits of the defending router 12 (including the IPv6 interface circuit 50, the routing circuit, the memory circuit 54, and their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal memory (e.g., within the memory circuit 54) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 54 can be implemented as a non-volatile memory, for example an EPROM, a DRAM, etc.

Further, any reference to "outputting a message" (e.g., a router advertisement message 72 or a neighbor advertisement message 74) or "outputting a packet" can be implemented based on creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" (e.g., the router advertisement message 38) or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

FIG. 4 is a diagram illustrating an example router advertisement message 72 output by the neighbor advertisement/router advertisement generation circuit 64 of the defending router 12, according to an example embodiment. The router advertisement message 72 generated by the circuit 64 can include an IPv6 header 76, router advertisement Internet Control Message Protocol (ICMP) fields 78 in accordance with Section 4.2 of RFC 2461, a Source Link-Layer Address (SLLA) Option field 79 in accordance with Sections 4.2 and 4.6.1 of RFC 2461, and a prefix information option (PIO) field 80 in accordance with Sections 4.2 and 4.6.2 of RFC 2461. In particular, the router advertisement message 72 generated by the generation circuit 64 of the defending router 12 includes an IP source address field 82 and an IP destination address field 86 in the IP header 76. The IP source address field 82 does not specify the link local address ("FE80::DF") 84 of the IPv6 interface circuit 50 of the defending router 12, but rather the generation circuit 64 inserts into the IP source address field 82 the link local address ("FE80::A") 40 of the rogue router 28. Hence, each IPv6 host 24 and 26 assumes that the router advertisement message 72 is transmitted from the rogue router 28, when in fact the defending router 12 impersonates the rogue router 28 by inserting the rogue router link local address 40 within the source address field 82 and its own MAC address 83 within the link layer address field 81 (the Type=1 field in the SLLA option 79 identifies the address field 81 as a source link-layer address). Note that the defense circuit 62, concurrently with generating the router advertisement message 72, can configure the IPv6 interface circuit 50 to accept incoming messages specifying the destination address "FE80::A" of the rogue router 28.

The router advertisement ICMP fields 78 can include a router lifetime field 88 that is set to zero by the generation circuit 64, causing all hosts 24 and 26 receiving the router advertisement message 72 to interpret that the rogue router 28 is not a default router and should not appear on their internal default router lists, in accordance with Section 4.2 of RFC 2461. The SLLA option field 79 includes a source link layer address field 81 that specifies the link layer (e.g., a media access control (MAC) address) of the defending router interface 84, illustrated for example as the 48-bit hexadecimal value "0004.2010.00DF" 83. The prefix information option field 80 can include a valid lifetime field 90 set to zero by the generation circuit 64, a preferred lifetime field 92 set to zero by the generation circuit 64, a prefix length field 94 specifying the length ("32") of the unauthorized prefix 44, a prefix field 96 specifying the unauthorized prefix ("2001:0210::/32") 44, and an on-link flag 98 set to zero by the generation circuit 64, in accordance with Section 4.6.2 of RFC 2461. Hence, any of the hosts 24 or 26 receiving the router advertisement message 72 determine from the valid lifetime field 90 set to zero that the prefix 44 specified in the prefix field 96 is not valid for the purpose of on-link determination, and therefore remove the prefix 44 from their prefix lists. Further, the hosts 24 or 26 respond to the SLLA option 79 by updating their neighbor cache entry for the link local address "FE80::A" 40 of the rogue router 28 by replacing the link layer address of the rogue router 28 with the link layer address "0004.2010.00DF" 83 of the defending router interface 84. Hence, the hosts 24 or 26 will send any packets destined for the link local address "FE80::A" 40 to the defending router 12 instead of the rogue router 12.

Figure 5:
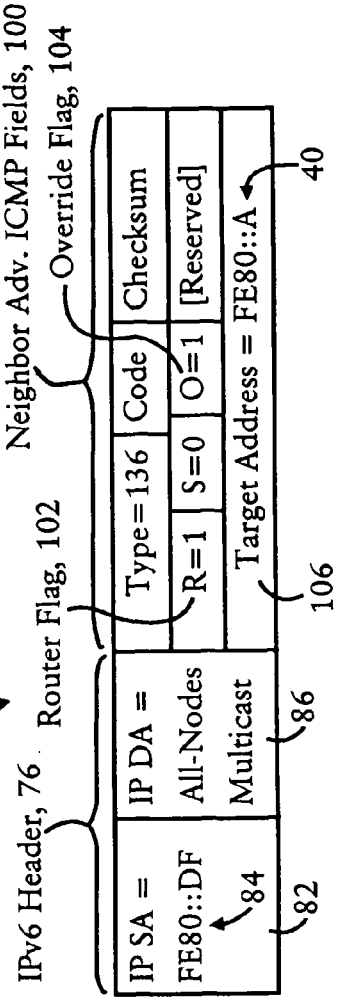
FIG. 5 illustrates an example neighbor advertisement message output by the defending router of FIGS. 1 and 2 for defending against a detected rogue router, according to an example embodiment.

FIG. 5 is a diagram illustrating an example neighbor advertisement message 74 output by the generation circuit 64, according to an example embodiment. As illustrated in FIG. 5, the generation circuit 64 inserts into the source address field 82 the link local address ("FE80::DF") 84 of the defending router 12, and specifies an all nodes multicast address in the destination address field 86. The neighbor advertisement message 74 also can include neighbor advertisement ICMP fields 100, including a router flag 102 set to "1" by the generation circuit 64, an override flag 104 set to "1" by the generation circuit 64, and a target address field 106 that specifies the link local address ("FE80::A") 40 of the rogue router 28. Hence, the IPv6 hosts 24 or 26 receiving the neighbor advertisement message 74 can determine from the router flag 102 that the defending router 12 is, in fact, a router; further, the IPv6 hosts 24 or 26 can determine from the override flag 104 and the target address field 106 that they should override an existing neighbor cache entry (specifying the link local address 40 of the rogue router 28), and replace the rogue router link local address 40 with the defending router link local address 84, in accordance with Section 4.4 of RFC 2461. As referenced in RFC 2461, an IPv6 node can resolve between a link local address of a node, the link layer address (e.g., EUI-64 interface identifier) of the node, and corresponding layer 2 MAC address in accordance with RFC 2462.

Hence, the IPv6 hosts 24 or 26 respond to the neighbor advertisement message 74 by removing the rogue router link local address 40 (and/or the associated link layer address of the rogue router) from their respective internal neighbor caches, and inserting in place of the rogue router link local address 40 the defending router link local address 84. Consequently, the non-SEND enabled host 24 no longer communicates with the rogue router 28, but rather communicates with the defending router 12.

The defense circuit 62 also can include a layer 2 policy circuit 66 that can be configured for implementing link layer defensive operations against the identified rogue router 28, including sending an alert to a prescribed management agent 18 to alert a network administrator of the presence of the rogue router 28. The layer 2 policy circuit 66 also can be configured for sending an instruction, according to a prescribed protocol, to a network switch 16 to deny access to the rogue router 28 based on its link layer address.

Hence, the rogue router 28 can be effectively isolated from the local area network 14 to minimize adverse effects. Further, the active attack on the rogue router 28 by the generation circuit 64 provides an active defense mechanism for the non-SEND enabled IPv6 host 24. In particular, the non-SEND enabled IPv6 host 24 responds to the router advertisement message 72 by removing the unauthorized prefix 44 from its internal prefix list and the identifier 40 of the rogue router 28 from its default router list, and updating the neighbor cache by associating the link layer address 83 of the defending router interface circuit 50 with the rouge router link local address "FE80::A" 40) (see, e.g., Section 5.1 of RFC 2461); the impersonating neighbor advertisement message 74 causes the IPv6 host 24 to replace the link local address 40 of the rogue router 28, stored in its internal neighbor cache (see, e.g., Section 5.1 of RFC 2461), with the link local address of the defending router 12.

Figure 3:
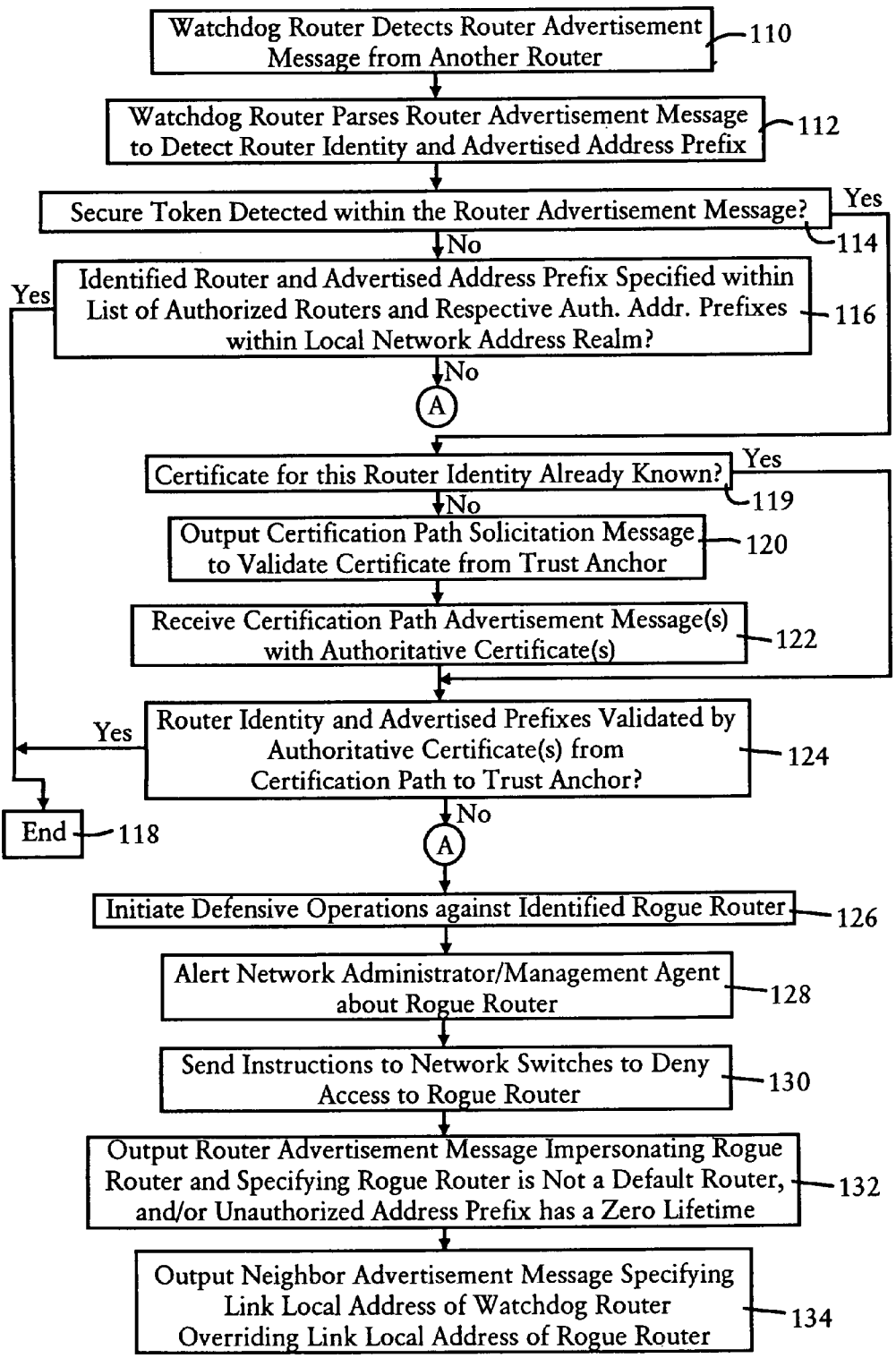
FIG. 3 is a diagram illustrating a method by the defending router of FIGS. 1 and 2 of authenticating routers and advertised address prefixes, according to an example embodiment.

FIG. 3 is a diagram illustrating an example method by the defending router 12 of FIG. 2 of defending non-SEND enabled hosts 24 from unauthorized address prefixes, according to an example embodiment.

The steps described in FIG. 3 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

In response to the IPv6 interface circuit 50 of the defending router (i.e., "watchdog router") 12 detecting the router advertisement message 38 in step 110 from the router 28, the IPv6 interface circuit 50 passes the router advertisement message 38 to the routing circuit 52 of the defending router 12. The router advertisement parser 58 of the defending router 12 parses in step 112 the received router advertisement message 38 to detect the identity of the router 28 having sent the router advertisement message 38 (e.g., based on the link local address ("FE80::A") 40 specified in the source address field of the received advertisement message 38), and the advertised address prefix 44. The parsed contents of the router advertisement message 38 are then forwarded to the SEND authentication circuit 60 for determination whether the identified router 28 is authorized to advertise the advertised address prefix 44 on the network link 46.

If in step 114 the authentication circuit 60 does not detect a secure token 42, for example an RSA digital signature as required in RFC 3971 (or alternately a digital certificate or at least a public key), the authentication circuit 60 determines in step 116 whether the IPv6 link local address 40 of the advertising network node 28 is specified in the authorized router list 68, and/or whether the advertised address prefix 44 is within the prescribed address realm 46 of the local area network 14, based on accessing the local table 56 in the memory circuit 54. Assuming the advertised address prefix is within the prescribed address realm 46, the authentication circuit 60 can determine whether the advertised prefix is an authorized prefix 70 being advertised by a corresponding authorized router 68. Hence, if in step 116 the IPv6 link local address 40 is identified in the authorized router list 68 and the advertised address prefix is identified in the authorized prefix list 70 as an authorized prefix 70 advertised by a corresponding authorized router 68, the authentication circuit 60 determines that the identified router is authorized to advertise the address prefix, and ends processing in step 118.

If, however, the authentication circuit 60 determines in step 116 that the advertised address prefix ("2001:0210::/32") 44 is not within the prescribed address realm ("2001:0211:0311::/48") 46 of the network 14, or that the advertised address prefix is within the prescribed address from but not advertised by a node that is authorized to advertise itself as a router based on the authorized router list 68, or that an authorized router identified in the authorized router list 68 is advertising an address prefix that is not identified in the prefix list 70 as authorized to be advertised by the router, the authentication circuit 60 sends a notification to the defense circuit 62 to initiate defensive operations in step 126, described below.

If in step 114 the authentication circuit 60 detects a secure token 42 from the router advertisement message 38, for example an RSA digital signature as described in RFC 3971, and assuming the authentication circuit 60 does not detect in step 119 a digital certificate for validating the router identity claimed by the digital signature (e.g., the appropriate certificate is not stored locally in the certificate cache 57), the authentication circuit 60 outputs in step 120 a Certification Path Solicitation Message, as described for example in Section 6.4 of RFC 3971, to prompt routers to generate Certification Path Advertisements from the prescribed trust anchor 30.

Assuming in step 122 that the defending router 12 receives at least one Certification Path Advertisement Message that contains a corresponding authoritative certificate in accordance with RFC 3971 (also referred to as a delegating authority's certificate), and preferably the required Certification Path Advertisement Messages to establish a certification path to the trust anchor 30, the SEND authentication circuit 60 determines in step 124 whether the received secure token (e.g., digital signature) 42 is validated by the authoritative certificate in accordance with RFC 3971, to determine whether the router identity and advertised prefix are validated by the authoritative certificate. In particular, the SEND authentication circuit 60 first determines in step 124 from the authoritative certificate whether the source of the router advertisement message is authorized to act as a router, and therefore advertise itself as a router, in accordance with RFC 3971, based on determining whether the IPv6 address 40 used by the router is within an address range entry specified in the authoritative certificate; assuming the authoritative certificate verifies the source (router 28) is authorized to act as a router, the SEND authentication circuit 60 also can determine if the advertised prefix (or prefixes) 44 specified in the router advertisement message 44 also is validated by the authoritative certificate in accordance with RFC 3971, for example based on determining that the same advertised prefix 44 (which also may be specified in the secure token 42) is contained within an address prefix entry in the authoritative certificate. If the authentication circuit 60 determines that the secure token 42 is not validated by a certification path to the trust anchor 30 as established by the authoritative certificate, or that the secure token 42 is valid but the advertised prefix 44 is not validated by the authoritative certificate (or the secure token 42) according to RFC 3971, the authentication circuit 60 sends a notification to the defense circuit 62 to initiate defensive operations in step 126.

The defense circuit 62 initiates defensive operations in step 126, including the layer 2 policy circuit 66 alerting in step 128 the network administrator 18 about the presence of the rogue router 28. Hence, the network administrator 18 can take corrective measures to locate and physically disable the rogue router 28, or at least reconfigure the rogue router 28 if the lack of authorization is due to a misconfiguration of the router 28.

The layer 2 policy circuit 66 also can send instructions in step 130 to network switches 16 to deny access to the rogue router 28 based on its link layer address, in order to isolate the rogue router 28. Hence, the adverse effects of the rogue router 28 can be isolated based on layer 2 access and policy enforcement.

The neighbor advertisement/router advertisement generation circuit 64 also can output in step 132 the router advertisement message 72 of FIG. 4 that impersonates the rogue router 28 based on specifying the rogue router link local address ("FE80::A") 40 in the source address field 82, specifying in the router lifetime field 88 a value of zero to indicate the router is not a default router, and that the unauthorized address prefix ("2001:0210::/32") 44 specified in the prefix fields 96 has a zero valid lifetime value in the valid lifetime field 90. Hence, the non-send enabled IPv6 host 24 can remove the unauthorized address prefix 44 from its prefix list in response to reception of the router advertisement message, based on the unauthorized address prefix 44 being no longer valid for one-link determination.

The neighbor advertisement/router advertisement generation circuit 64 also can output in step 134 the neighbor advertisement message 74 of FIG. 5, specifying that the link local address ("FE80::DF") 84 of the defending router 12 overrides the rogue router link local address ("FE80::A") 40. Hence, the non-send enabled IPv6 host 24 can replace the rogue router of link local address 40 in its neighbor cache with the defending router link local address 84.

According to the example embodiments, a router can be configured as a rogue detection mechanism in order to validate received router advertisement messages to ensure the advertising routers are authorized to act as routers and/or claim the respective advertised prefixes, for example based on locally-stored authorization data, or based on authenticating supplied certificates according to the SEND protocol as specified by RFC 3971. Further, the router also can defend against rogue routers by implementing link layer policies to isolate the rogue router, initiating network management procedures to alert the presence of the rogue router, for example based on sending an e-mail message to a network administrator, setting a Simple Network Management Protocol (SNMP) alarm or trap, etc. The router also can effectively attack the rogue router by impersonating the rogue router to output router advertisement messages to halt use of the unauthorized address prefix by IPv6 host nodes, and neighbor advertisement messages that direct the IPv6 host nodes away from the rogue router and toward the defending router.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    receiving, by a router in a network, a router advertisement message on a network link of the network;
    parsing the router advertisement message, by the router, to detect an advertised address prefix within a first field of the router advertisement message and an address of an identified router having transmitted the router advertisement message within the network, the address detected within a second field of the router advertisement message;

determining, by the router, whether the identified router is authorized to advertise on the network link the advertised address prefix having been parsed from the router advertisement message; and selectively initiating, by the router, a defensive operation against the identified router based on the router determining the identified router is not authorized to advertise on the network link the advertised address prefix having been parsed from the router advertisement message, the defensive operation including outputting a message to counter the identified router having sent the router advertisement message.

2. The method of claim 1, wherein:
the network has a prescribed address realm; and
the determining includes determining whether the advertised address prefix is within the prescribed address realm, and whether the identified router is identifiable from a prescribed list of authorized routers within the prescribed address realm.

3. The method of claim 1, wherein the detecting includes detecting a secure token within the router advertisement message, and the determining includes validating whether the secure token authorizes the identified router to advertise the advertised address prefix.

4. The method of claim 3, wherein the validating of the secure token includes outputting a certification path solicitation message for requesting a certification path, and determining whether the certification path is established that validates the secure token is authorized by a trust anchor based on at least one received certification path advertisement message.

5. The method of claim 1, wherein the defensive operation includes sending the message as an alert to a prescribed management agent in the network.

6. The method of claim 1, wherein:
the detecting includes identifying the identified router based on a source address value specified within a corresponding source address field of the router advertisement message,
the defensive operation includes outputting the message as a second router advertisement message that supersedes the router advertisement message having been sent by the identified router, the second router advertisement message having a source address field that specifies the source address value of the identified router, and at least one of a router lifetime field specifying the identified router is not a default router, a source link layer address option specifying a link layer address of the router, or a prefix information option specifying the advertised address prefix specified in the router advertisement message has a lifetime of zero.

7. The method of claim 6, wherein the defensive operation further includes outputting a neighbor advertisement message that specifies an IP address of the router in the corresponding source address field, a set router flag identifying the router as having router capabilities, and an override flag indicating the neighbor advertisement message is to override the source address value of the identified router, specified within a target address field, with the IP address of the router.

8. The method of claim 1, wherein the defensive operation includes outputting the message as a neighbor advertisement message that specifies an IP address of the router in a corresponding source address field, a set router flag identifying the router as having router capabilities, and an override flag indicating the neighbor advertisement message is to override the source address value of the identified router, specified within a target address field, with the IP address of the router.

9. The method of claim 1, wherein the defensive operation includes sending the message as an instruction, according to a prescribed protocol, to network switches to deny access to the identified router.

10. A router comprising:
an Internet Protocol (IP) interface circuit configured for receiving a router advertisement message on a network link in a network;
a routing circuit configured for parsing the router advertisement message to detect an advertised address prefix within a first field of the router advertisement message and an address of an identified router having transmitted the router advertisement message within the network, the address detected within a second field of the router advertisement message, the routing circuit further configured for determining whether the identified router is authorized to advertise on the network link the advertised address prefix having been parsed from the router advertisement message, the routing circuit further configured for selectively initiating a defensive operation against the identified router based on determining the identified router is not authorized to advertise on the network link the advertised address prefix having been parsed from the router advertisement message, the defensive operation including outputting a message to counter the identified router having sent the router advertisement message.

11. The router of claim 10, wherein the network has a prescribed address realm, the routing circuit further configured for determining whether the identified router is authorized to advertise the advertised address prefix on the network link based on determining whether the advertised address prefix is within the prescribed address realm, and whether the identified router is identifiable from a prescribed list of authorized routers within the prescribed address realm.

12. The router of claim 10, wherein the routing circuit, in response to detecting a secure token within the router advertisement message, is configured for determining whether the identified router is authorized to advertise the advertised address prefix on the network link based on validating whether the secure token authorizes the identified router to advertise the advertised address prefix.

13. The router of claim 10, wherein the validating of the secure token includes outputting a certification path solicitation message for requesting a certification path, and determining whether the certification path is established that validates the secure token is authorized by a trust anchor based on at least one received certification path advertisement message.

14. The router of claim 10, wherein the defensive operation initiated by the routing circuit includes sending the message as an alert to a prescribed management agent in the network.

15. The router of claim 10, wherein:
the routing circuit is configured for identifying the identified router based on a source address value specified within a corresponding source address field of the router advertisement message,
the defensive operation initiated by the routing circuit including outputting the message as a second router advertisement message that supersedes the router advertisement message having been sent by the identified router, the second router advertisement message having a source address field that specifies the source address value of the identified router, and at least one of a router lifetime field specifying the identified router is not a default router, a source link layer address option specifying a link layer address of the router, or a prefix information option specifying the advertised address prefix specified in the router advertisement message has a lifetime of zero.

16. The router of claim 15, wherein the defensive operation initiated by the routing circuit further includes outputting a neighbor advertisement message that specifies an IP address of the router in the corresponding source address field, a set router flag identifying the router as having router capabilities, and an override flag indicating the neighbor advertisement message is to override the source address value of the identified router, specified within a target address field, with the IP address of the router.

17. The router of claim 10, wherein the defensive operation initiated by the routing circuit includes outputting the message as a neighbor advertisement message that specifies an IP address of the router in a corresponding source address field, a set router flag identifying the router as having router capabilities, and an override flag indicating the neighbor advertisement message is to override the source address value of the identified router, specified within a target address field, with the IP address of the router.

18. The router of claim 10, wherein the defensive operation initiated by the routing circuit includes sending the message as an instruction, according to a prescribed protocol, to network switches to deny access to the identified router.

19. An apparatus comprising:
means for receiving a router advertisement message on a network link in a network; and
means for parsing the router advertisement message to detect an advertised address prefix within a first field of the router advertisement message and an address of an identified router having transmitted the router advertisement message within the network, the address detected within a second field of the router advertisement message, the means for detecting further determining whether the identified router is authorized to advertise on the network link the advertised address prefix having been parsed from the router advertisement message, the means for detecting further selectively initiating a defensive operation against the identified router based on determining the identified router is not authorized to advertise on the network link the advertised address prefix having been parsed from the router advertisement message, the defensive operation including outputting a message to counter the identified router having sent the router advertisement message.

* * * * *